United States Patent
Yamasaki et al.

(10) Patent No.: US 10,439,384 B2
(45) Date of Patent: Oct. 8, 2019

(54) HEAT-RECOVERABLE ARTICLE, METHOD FOR MANUFACTURING HEAT-RECOVERABLE ARTICLE, WIRE SPLICE, AND WIRE HARNESS

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Satoshi Yamasaki, Osaka (JP); Shinya Nishikawa, Osaka (JP); Yasutaka Emoto, Osaka (JP); Mamoru Sekiguchi, Osaka (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 12 days.

(21) Appl. No.: 15/568,804

(22) PCT Filed: Mar. 22, 2016

(86) PCT No.: PCT/JP2016/058937
§ 371 (c)(1),
(2) Date: Oct. 24, 2017

(87) PCT Pub. No.: WO2016/174961
PCT Pub. Date: Nov. 3, 2016

(65) Prior Publication Data
US 2018/0301886 A1    Oct. 18, 2018

(30) Foreign Application Priority Data
Apr. 28, 2015 (JP) .................. 2015-092436

(51) Int. Cl.
H02G 15/18    (2006.01)
B29C 47/00    (2006.01)
(Continued)

(52) U.S. Cl.
CPC ..... *H02G 15/1806* (2013.01); *B29C 48/0017* (2019.02); *B29C 48/21* (2019.02);
(Continued)

(58) Field of Classification Search
CPC ........ H02G 15/1806; H01B 3/30; H01B 3/44; H01B 3/441
See application file for complete search history.

(56) References Cited

U.S. PATENT DOCUMENTS 5,378,856 A      1/1995   Allen
2009/0101268 A1  4/2009   Kawakita et al.
(Continued)

FOREIGN PATENT DOCUMENTS

JP    H11-122746 A    4/1999
JP    2000-119403 A   4/2000
(Continued)

*Primary Examiner* — Timothy J Thompson
*Assistant Examiner* — Amol H Patel
(74) *Attorney, Agent, or Firm* — Drinker Biddle & Reath LLP (57) ABSTRACT

The heat-recoverable article according to the present invention has a cylindrical shape and includes a base material layer. The base material layer contains a polyolefin-based resin. In the base material layer after being heated at 180° C. for 2 minutes, a melting-point peak temperature is 115° C. or higher and 128° C. or lower, a heat of fusion of a total resin component is 80 J/g or more and 150 J/g or less, a storage modulus at 120° C. is 4 MPa or more, a gel fraction is 40% by mass or more and 80% by mass or less, and a storage modulus at 180° C. is 0.5 MPa or more and less than 3.0 MPa. The polyolefin-based resin is preferably a mixture of a first polyolefin-based resin having a melting point of 125° C. or higher and 135° C. or lower and a second polyolefin-based resin having a melting point of lower than 125° C.

15 Claims, 4 Drawing Sheets

(51) Int. Cl.
| | |
|---|---|
| *B29C 47/06* | (2006.01) |
| *H01B 17/58* | (2006.01) |
| *H01B 7/00* | (2006.01) |
| *H01B 3/44* | (2006.01) |
| *H01B 19/00* | (2006.01) |
| *C08L 23/06* | (2006.01) |
| *B29C 48/00* | (2019.01) |
| *B29C 48/21* | (2019.01) |
| *B32B 7/02* | (2019.01) |
| *B32B 27/32* | (2006.01) |
| *B32B 1/08* | (2006.01) |
| *C08L 23/00* | (2006.01) |
| *H01B 3/30* | (2006.01) |
| *H01B 7/28* | (2006.01) |
| *B29K 105/00* | (2006.01) |
| *B29L 23/00* | (2006.01) |

(52) U.S. Cl.
CPC ............... *B32B 1/08* (2013.01); *B32B 7/02* (2013.01); *B32B 27/32* (2013.01); *C08L 23/00* (2013.01); *C08L 23/06* (2013.01); *H01B 3/30* (2013.01); *H01B 3/44* (2013.01); *H01B 3/441* (2013.01); *H01B 7/00* (2013.01); *H01B 7/0045* (2013.01); *H01B 7/28* (2013.01); *H01B 17/58* (2013.01); *H01B 19/00* (2013.01); *B29K 2023/06* (2013.01); *B29K 2105/0097* (2013.01); *B29K 2995/0049* (2013.01); *B29L 2023/00* (2013.01); *C08L 2203/30* (2013.01); *C08L 2205/025* (2013.01); *C08L 2205/03* (2013.01); *C08L 2207/062* (2013.01); *C08L 2207/064* (2013.01); *C08L 2207/066* (2013.01)

(56) References Cited

U.S. PATENT DOCUMENTS

| | | | |
|---|---|---|---|
| 2015/0357810 A1* | 12/2015 | Yamasaki | B32B 7/02 174/88 R |
| 2016/0019999 A1 | 1/2016 | Yamasaki et al. | |
| 2016/0089847 A1 | 3/2016 | Fukumoto et al. | |
| 2016/0190787 A1 | 6/2016 | Yamasaki et al. | |

FOREIGN PATENT DOCUMENTS

| | | |
|---|---|---|
| JP | 2004-342868 A | 12/2004 |
| JP | 2007-172967 A | 7/2007 |
| JP | 2015-66701 A | 4/2015 |
| WO | WO-2006/129477 A1 | 12/2006 |
| WO | WO-2015/068511 A1 | 5/2015 |
| WO | WO-2015/068512 A1 | 5/2015 |
| WO | WO-2015/151928 A1 | 10/2015 |

* cited by examiner

FIG. 10 ical wires is covered with a heat-shrinkable tube and heating is performed, the heat-shrinkable tube shrinks so as to conform to the shape of the connected portion and comes into close contact with the connected portion. Thus, the heat-shrinkable tube can protect the connected portion. From the viewpoint of manufacturability and usability, crosslinked polymers can be used for the heat-recoverable articles.

HEAT-RECOVERABLE ARTICLE, METHOD FOR MANUFACTURING HEAT-RECOVERABLE ARTICLE, WIRE SPLICE, AND WIRE HARNESS

TECHNICAL FIELD

The present invention relates to a heat-recoverable article, a method for manufacturing a heat-recoverable article, a wire splice, and a wire harness.

BACKGROUND ART

Heat-recoverable articles such as heat-shrinkable tubes are used for, for example, protection, insulation, waterproofing, and corrosion protection of connected portions between insulated electrical wires, wiring terminals, metal tubes, and the like and for packaging of commercial products. For example, when a connected portion between insulated electrical wires is covered with a heat-shrinkable tube and heating is performed, the heat-shrinkable tube shrinks so as to conform to the shape of the connected portion and comes into close contact with the connected portion. Thus, the heat-shrinkable tube can protect the connected portion. From the viewpoint of manufacturability and usability, crosslinked polymers can be used for the heat-recoverable articles.

An olefin-based polymer having a gel fraction in a range of 20% to 80% has been proposed as an example of the crosslinked polymers (refer to Japanese Unexamined Patent Application Publication No. 2004-342868). Furthermore, a polymer having a degree of crosslinking of 25% or more has been proposed (refer to Japanese Unexamined Patent Application Publication No. 2007-172967).

CITATION LIST

Patent Literature

PTL 1: Japanese Unexamined Patent Application Publication No. 2004-342868

PTL 2: Japanese Unexamined Patent Application Publication No. 2007-172967

SUMMARY OF INVENTION

Technical Problem

In the manufacture of heat-recoverable articles, from the viewpoint of efficient manufacture, the expansion in diameter after molding is required to be stably performed. Furthermore, in the use of heat-recoverable articles, adhesiveness to an object to be covered and a sufficient shrinking rate are required. However, when heat-recoverable articles are manufactured by using the existing crosslinked polymers described above, the expansion in diameter after molding may not be stably performed. In addition, heat-recoverable articles obtained by using the existing crosslinked polymers described above may have insufficient adhesiveness to an object to be covered and an insufficient shrinking rate.

For some objects to be covered with a heat-recoverable article, there is a concern that the performance may be decreased by heat during heat shrinkage. For such objects to be covered, it is required that heat shrinkage at high temperatures be avoided, and heat shrinkage at relatively low temperatures of, for example, 130° C. or higher and 140° C. or lower be performed. However, in heat-recoverable articles obtained by using the existing crosslinked polymers described above, it may take a long time to cause shrinking at such temperatures.

Furthermore, the heat-recoverable articles described above are used in a wide temperature environment from about −60° C. to about 120° C. It is required that even when heat-recoverable articles are used in such a wide temperature environment, tearing and breaking do not occur from the viewpoint of usability. To prevent the occurrence of tearing and breaking of a heat-recoverable article during use, even when a temperature environment changes during use and a stress is locally applied to the heat-recoverable article, the heat-recoverable article needs to have such a rigidity that the heat-recoverable article can withstand this stress load. However, heat-recoverable articles obtained by using the existing crosslinked polymers described above may not have sufficient rigidity in such a wide temperature environment.

The present invention has been made in view of the circumstances described above. An object of the present invention is to provide a heat-recoverable article having good manufacturability and good shrinkability at relatively low temperatures such as 130° C. or higher and 140° C. or lower, and being capable of effectively suppressing the occurrence of tearing and breaking and having good adhesiveness to an object to be covered even when used in a wide temperature environment from about −60° C. to about 120° C., a method for manufacturing the heat-recoverable article, a wire splice using the heat-recoverable article, and a wire harness using the heat-recoverable article.

Solution to Problem

A heat-recoverable article according to an embodiment of the present invention, which has been made to solve the problems described above, provides a heat-recoverable article having a cylindrical shape and including a base material layer. The base material layer contains a polyolefin-based resin. In the base material layer after being heated at 180° C. for 2 minutes, a melting-point peak temperature is 115° C. or higher and 128° C. or lower, a heat of fusion of a total resin component is 80 J/g or more and 150 J/g or less, a storage modulus at 120° C. is 4 MPa or more, a gel fraction is 40% by mass or more and 80% by mass or less, and a storage modulus at 180° C. is 0.5 MPa or more and less than 3.0 MPa.

A method for manufacturing a heat-recoverable article according to another embodiment of the present invention, which has been made to solve the problems described above, provides a method for manufacturing a heat-recoverable article, the method including a step of molding a resin composition containing a polyolefin-based resin so as to have a cylindrical shape; and a step of forming a base material layer by expanding a diameter of the molded body, in which in the base material layer after being heated at 180° C. for 2 minutes, a melting-point peak temperature is 115° C. or higher and 128° C. or lower, a heat of fusion of a total resin component is 80 J/g or more and 150 J/g or less, a storage modulus at 120° C. is 4 MPa or more, a gel fraction is 40% by mass or more and 80% by mass or less, and a storage modulus at 180° C. is 0.5 MPa or more and less than 3.0 MPa.

A wire splice according to still another embodiment of the present invention, which has been made to solve the problems described above, includes a plurality of wires each of which includes a conductor and an insulating layer formed on the outside of the conductor; and a tube adhering to a portion where the conductors of the plurality of wires are connected together, the tube being formed by thermally shrinking the heat-recoverable article described above.

A wire harness according to still another embodiment of the present invention, which has been made to solve the problems described above, includes a plurality of wires each of which includes a conductor and an insulating layer formed on the outside of the conductor; and a tube adhering to the plurality of wires, the tube being formed by thermally shrinking the heat-recoverable article described above.

Advantageous Effects of Invention

The heat-recoverable article according to the present invention has good manufacturability and good shrinkability at relatively low temperatures such as 130° C. or higher and 140° C. or lower, is capable of effectively suppressing the occurrence of tearing and breaking and has good adhesiveness to an object to be covered, even when used in a wide temperature environment from about –60° C. to about 120° C. The method for manufacturing a heat-recoverable article according to the present invention can easily provide a heat-recoverable article having good shrinkability at relatively low temperatures such as 130° C. or higher and 140° C. or lower, being capable of effectively suppressing the occurrence of tearing and breaking and having good adhesiveness to an object to be covered, even when the heat-recoverable article is used in a wide temperature environment from about –60° C. to about 120° C. The wire splice and the wire harness according to the present invention each include a tube obtained by thermally shrinking the heat-recoverable article having good manufacturability, and thus the cost can be reduced.

DESCRIPTION OF EMBODIMENTS

Description of Embodiments of the Present Invention

A heat-recoverable article according to an embodiment of the present invention is a heat-recoverable article having a cylindrical shape and including a base material layer. The base material layer contains a polyolefin-based resin. In the base material layer after being heated at 180° C. for 2 minutes, a melting-point peak temperature is 115° C. or higher and 128° C. or lower, a heat of fusion of a total resin component is 80 J/g or more and 150 J/g or less, a storage modulus at 120° C. is 4 MPa or more, a gel fraction is 40% by mass or more and 80% by mass or less, and a storage modulus at 180° C. is 0.5 MPa or more and less than 3.0 MPa.

Since the melting-point peak temperature in the base material layer after being heated at 180° C. for 2 minutes is within the above range, the heat-recoverable article has good heat shrinkability at relatively low temperatures of, for example, 130° C. or higher and 140° C. or lower. In addition, since the gel fraction and the storage modulus at 180° C. are within the above ranges, the heat-recoverable article has good manufacturability. Furthermore, since the heat of fusion of the total resin component, the storage modulus at 120° C., the gel fraction, and the storage modulus at 180° C. in the base material layer after being heated at 180° C. for 2 minutes are within the above ranges, the occurrence of tearing and breaking can be effectively suppressed even when the heat-recoverable article is used in a wide temperature environment from about –60° C. to about 120° C., and thus the heat-recoverable article has good usability. It is estimated that when the heat-recoverable article is heated at 180° C. for 2 minutes, the heat-recoverable article enters a state in which shrinkage of the base material layer due to heat proceeds to completion (a state in which the shrinkage is completed). Therefore, the above characteristics of the heat-recoverable article are reliably obtained by adjusting the parameters after being heated at 180° C. for 2 minutes to the above ranges.

The term "melting-point peak temperature in the base material layer" refers to the temperature at which the amount of heat absorption per unit time reaches a maximum (peak) in a base material layer during a temperature rise when the temperature of the base material layer which has been heated at 180° C. for 2 minutes is increased from room temperature to 200° C. at 10° C./min by using a differential scanning calorimeter. The term "heat of fusion of the total resin component of the base material layer" refers to the value (J/g) determined by dividing the amount of heat absorption (J) of the base material layer during a temperature rise from room temperature to 200° C. by the mass (g) of the total resin component in the base material layer when the melting-point peak temperature is measured, under the assumption that heat absorption of the base material layer is totally caused by the polyolefin resin and other resin components contained in the base material layer. The differential scanning calorimetry is performed in accordance with JIS-K-7121 (1987). The term "storage modulus" refers to the first term (real term) forming the complex modulus that represents the relationship between the stress and the strain when a sinusoidal vibration strain is applied to a viscoelastic body and refers to a value determined by measuring dynamic viscoelasticity at a temperature rising rate of 10° C./min. The term "gel fraction" refers to a value determined by formula (1) below:

$$\text{Gel fraction}[\% \text{ by mass}] = W1/W2 \times 100 \quad (1)$$

where W1 [g] represents a solid mass after the base material layer is immersed in xylene and dissolved by being heated at 120° C. for 24 hours, and W2 [g] represents the mass of the base material layer before the base material layer is immersed in xylene.

The polyolefin-based resin is preferably a mixture of a first polyolefin-based resin having a melting point of 125° C. or higher and 135° C. or lower and a second polyolefin-based resin having a melting point of lower than 125° C. When the polyolefin-based resin is the above mixture, the melting-point peak temperature, the heat of fusion of the total resin component, the storage modulus at 120° C., the gel fraction, and the storage modulus at 180° C. of the base material layer can be adjusted to the above ranges more easily and reliably. A mass ratio of the first polyolefin-based resin to the second polyolefin-based resin is preferably 20/80 or more and 85/15 or less. When the mass ratio is within the above range, the melting-point peak temperature, the heat of fusion of the total resin component, the storage modulus at 120° C., the gel fraction, and the storage modulus at 180° C. of the base material layer can be adjusted to the above ranges more easily and reliably. Herein, the term "melting point" refers to a melting peak temperature determined by using a differential scanning calorimeter in accordance with JIS-K-7121 (1987).

The first polyolefin-based resin is preferably a high-density polyethylene. When the first polyolefin-based resin is the high-density polyethylene, the melting-point peak temperature, the heat of fusion of the total resin component, the storage modulus at 120° C., the gel fraction, and the storage modulus at 180° C. of the base material layer can be adjusted to the above ranges more easily and reliably.

The high-density polyethylene preferably has a melt flow rate (MFR) of 5 g/10 min or less. When the MFR of the high-density polyethylene is the above value or less, a decrease in transparency due to crystallization can be effectively suppressed. Herein, the term "melt flow rate (MFR)" refers to a value measured by using an extrusion plastometer in accordance with JIS-K-7210 (2014) at a temperature of 190° C. and a load of 21.6 kg.

The high-density polyethylene preferably has a density of 0.930 g/cm$^3$ or more and 0.960 g/cm$^3$ or less. When the density of the high-density polyethylene is within the above range, the shrinking rate at a relatively low temperature of 120° C. can be further increased, and a decrease in transparency due to cloudiness can be effectively suppressed. Herein, the term "density" refers to a value measured in accordance with JIS-Z-8807 (2012).

The second polyolefin-based resin is preferably a linear low-density polyethylene, a low-density polyethylene, a very low-density polyethylene, a polyolefin-based elastomer, or a combination thereof. When the second polyolefin-based resin is a linear low-density polyethylene, a low-density polyethylene, a very low-density polyethylene, a polyolefin-based elastomer, or a combination thereof, the melting-point peak temperature, the heat of fusion of the total resin component, the storage modulus at 120° C., the gel fraction, and the storage modulus at 180° C. of the base material layer can be adjusted to the above ranges more easily and reliably.

The polyolefin-based elastomer is preferably a polyethylene-based elastomer obtained by copolymerizing ethylene with at least any of butene, hexene, and octene or an ethylene-propylene copolymer elastomer. When the polyolefin-based elastomer is any of the elastomers described above, the melting-point peak temperature, the heat of fusion of the total resin component, the storage modulus at 120° C., the gel fraction, and the storage modulus at 180° C. of the base material layer can be adjusted to the above ranges more easily and reliably.

The polyolefin-based elastomer preferably has a Mooney viscosity of 10 or more at 100° C. When the Mooney viscosity of the polyolefin-based elastomer at 100° C. is the above value or more, crosslinking properties can be improved, manufacturability and shrinkability during heat shrinkage can be further improved, and stability in long-term use can be enhanced. Herein, the term "Mooney viscosity" refers to a value measured by using a Mooney viscometer in accordance with JIS-K-6300-1 (2013) at a temperature of 100° C.

A time until a heat shrinkage ratio of the base material layer reaches 80% after the heat-recoverable article is placed in an atmosphere at 200° C. is preferably less than 50 seconds. When the time is less than the above value, the shrinking rate during heat shrinkage can be further enhanced.

The heat-recoverable article preferably includes an adhesive layer formed on an inner circumferential surface of the base material layer. The presence of the adhesive layer can enhance adhesiveness between a cover portion to be covered with the heat-recoverable article and the base material layer.

The adhesive layer preferably contains an ethylene-vinyl acetate copolymer or a polyamide. When the adhesive layer contains an ethylene-vinyl acetate copolymer or a polyamide, adhesiveness between a cover portion to be covered with the heat-recoverable article and the base material layer can be further enhanced.

A method for manufacturing a heat-recoverable article according to another embodiment of the present invention includes a step of molding a resin composition containing a polyolefin-based resin so as to have a cylindrical shape; and a step of forming a base material layer by expanding a diameter of the molded body, in which in the base material layer after being heated at 180° C. for 2 minutes, a melting-point peak temperature is 115° C. or higher and 128° C. or lower, a heat of fusion of a total resin component is 80 J/g or more and 150 J/g or less, a storage modulus at 120° C. is 4 MPa or more, a gel fraction is 40% by mass or more and 80% by mass or less, and a storage modulus at 180° C. is 0.5 MPa or more and less than 3.0 MPa.

In the method for manufacturing a heat-recoverable article, a resin composition that provides a base material layer in which the gel fraction after being heated at 180° C. for 2 minutes is within the above range and the storage modulus at 180° C. after being heated at 180° C. for 2 minutes is within the above range is used. Accordingly, the occurrence of nonuniformity in the thickness of the heat-recoverable article and the occurrence of tearing during the expansion in diameter can be effectively suppressed. Furthermore, it is possible to efficiently manufacture a heat-recoverable article that exhibits high shrinkage performance during heat shrinkage to achieve good adhesiveness to an object to be covered.

A wire splice according to still another embodiment of the present invention includes a plurality of wires each of which includes a conductor and an insulating layer formed on the outside of the conductor, and a tube adhering to a portion where the conductors of the plurality of wires are connected together, the tube being formed by thermally shrinking the heat-recoverable article described above.

Since the wire splice includes a tube formed by thermally shrinking the heat-recoverable article and the heat-recoverable article has good manufacturability, the cost can be reduced.

A wire harness according to still another embodiment of the present invention includes a plurality of wires each of which includes a conductor and an insulating layer formed on the outside of the conductor, and a tube adhering to the plurality of wires, the tube being formed by thermally shrinking the heat-recoverable article described above.

Since the wire harness includes a tube formed by thermally shrinking the heat-recoverable article and the heat-recoverable article has good manufacturability, the cost can be reduced.

DETAILS OF EMBODIMENTS OF THE PRESENT INVENTION

Heat-recoverable articles, methods for manufacturing heat-recoverable articles, wire splices, and wire harnesses according to the present invention will now be described with reference to the drawings.

[Heat-Recoverable Article]

First, embodiments of a heat-recoverable article will be described below.

First Embodiment

Figure 1:
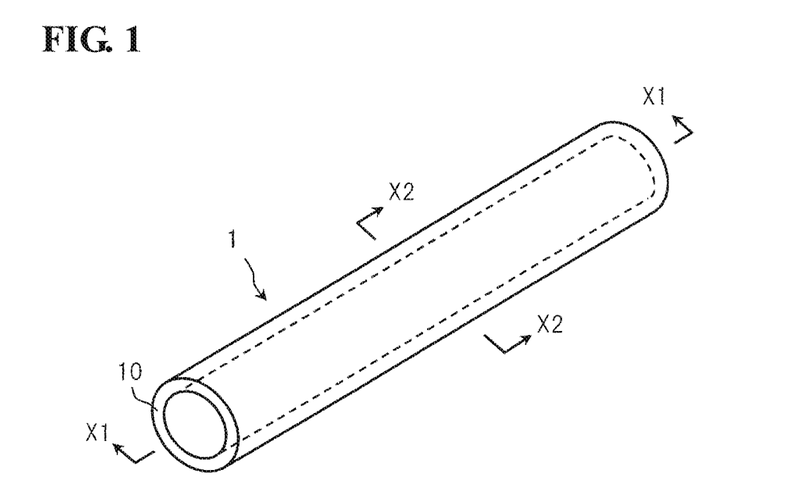
FIG. 1 is a schematic perspective view illustrating a heat-recoverable article according to a first embodiment of the present invention.
Figure 2:
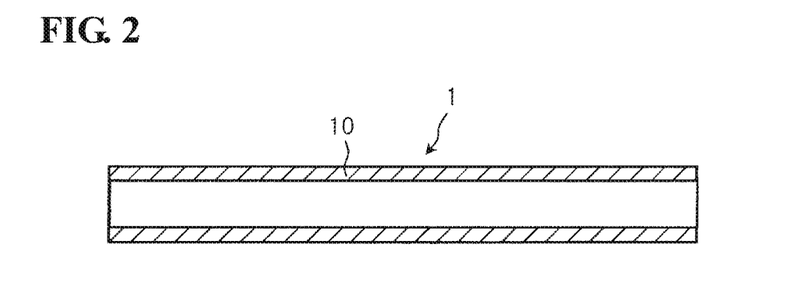
FIG. 2 is a schematic sectional view taken along line X1-X1 in FIG. 1.
Figure 3:
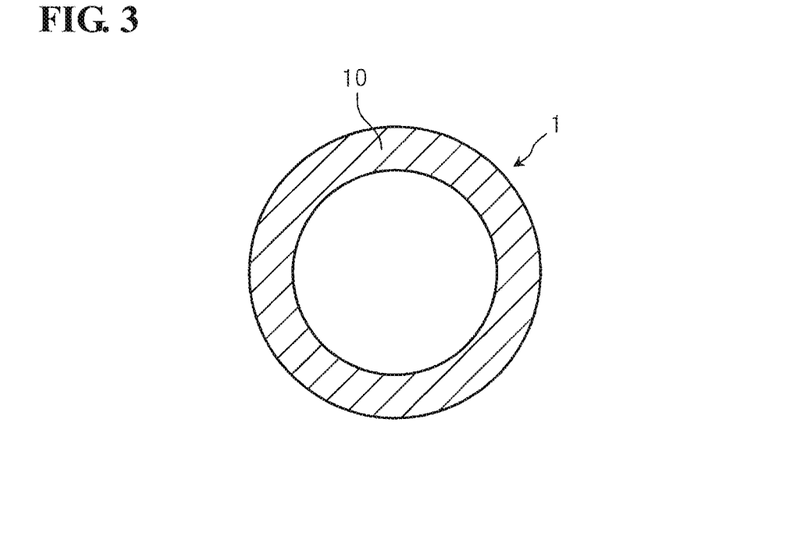
FIG. 3 is a schematic sectional view taken along line X2-X2 in FIG. 1.

A heat-recoverable article 1 of a first embodiment illustrated in FIGS. 1 to 3 is a heat-recoverable article having a cylindrical shape and including a base material layer. The base material layer contains a polyolefin-based resin. In the base material layer after being heated at 180° C. for 2 minutes, a melting-point peak temperature is 115° C. or higher and 128° C. or lower, a heat of fusion of a total resin component is 80 J/g or more and 150 J/g or less, a storage modulus at 120° C. is 4 MPa or more, a gel fraction is 40% by mass or more and 80% by mass or less, and a storage modulus at 180° C. is 0.5 MPa or more and less than 3.0 MPa.

The heat-recoverable article 1 is used as a cover for, for example, protection, insulation, waterproofing, and corrosion protection of connected portions between insulated electrical wires, wiring terminals, metal tubes, and the like. This heat-recoverable article 1 includes a base material layer 10.

<Base Material Layer>

The base material layer 10 preferably contains a polyolefin-based resin as a main component. The term "main component" refers to a component having a highest content and, for example, a component having a content of 50% by mass or more. The base material layer 10 is formed as a tube whose diameter is reduced by heating. The base material layer 10 may contain a flame retardant. Furthermore, other additives may be added to the base material layer 10, as required. Examples of the additives include an oxidation inhibitor, a copper inhibitor, a lubricant, a coloring agent, a heat stabilizer, and an ultraviolet absorber.

<Melting-Point Peak Temperature of Base Material Layer>

The base material layer 10 preferably has a single melting-point peak temperature. Heat shrinkage of the heat-recoverable article 1 occurs around the melting-point peak temperature of the base material layer 10. Accordingly, when the number of melting-point peak temperatures is one, during heating, the heat-recoverable article 1 thermally shrinks not stepwise but in one step.

The lower limit of the melting-point peak temperature in the base material layer 10 after being heated at 180° C. for 2 minutes is 115° C., preferably 116° C., and more preferably 118° C. The upper limit of the melting-point peak temperature is 128° C. and preferably 126° C. When the melting-point peak temperature is less than the lower limit and the heat-recoverable article 1 is used in a use environment at about 120° C. in a state where a local stress is applied to the base material layer 10 due to a change in the temperature environment during use, tearing and breaking easily occur in the base material layer 10 as the base material layer 10 softens. When the melting-point peak temperature exceeds the upper limit, heat during heat shrinkage may impair the performance of an article to be covered with the heat-recoverable article 1.

(Polyolefin-Based Resin)

Examples of the polyolefin-based resin include polyethylenes, ethylene-α-olefin copolymers, ethylene-vinyl ester copolymers, ethylene-α,β-unsaturated carboxylic acid alkyl ester copolymers, olefin-based thermoplastic elastomers, and olefin-based rubbers.

The lower limit of a melt flow rate (MFR) of the polyolefin-based resin is preferably 0.01 g/10 min, and more preferably 0.1 g/10 min. The upper limit of the MFR is preferably 10 g/10 min, and more preferably 4 g/10 min. When the MFR is less than the lower limit, the extrusion pressure in preparation of the base material layer 10 by extrusion molding may increase, and the appearance of the base material layer 10 may decrease. When the MFR exceeds the upper limit, flowability of the composition forming the base material layer 10 tends to become excessively high, and it becomes difficult to make the shape of the base material layer 10 uniform in preparation of the base material layer 10 by extrusion molding. Furthermore, the polyolefin-based resin has a low molecular weight, and a sufficient gel fraction and a sufficient storage modulus may not be obtained in the base material layer 10.

Examples of polyethylenes include low-density polyethylenes obtained by a high-pressure radical polymerization method, very low-density polyethylenes, linear low-density polyethylenes, high-density polyethylenes, and metallocene polymerized polyethylenes.

Examples of the α-olefin of the ethylene-α-olefin copolymers include α-olefins having about 3 to 20 carbon atoms. More specifically, examples of the α-olefin include propylene, 1-butene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, and 12-ethyl-1-tetradecene.

Examples of the vinyl ester of the ethylene-vinyl ester copolymers include vinyl propionate, vinyl acetate, vinyl caproate, vinyl caprylate, vinyl laurate, vinyl stearate, and vinyl trifluoroacetate.

Examples of the α,β-unsaturated carboxylic acid alkyl ester of the ethylene-α,β-unsaturated carboxylic acid alkyl ester copolymers include methyl acrylate, methyl methacrylate, ethyl acrylate, and ethyl methacrylate.

Examples of the olefin-based thermoplastic elastomers include low-density polyethylene elastomers, very low-density polyethylene elastomers, and polypropylene elastomers.

Examples of the olefin-based rubbers include ethylene-propylene rubbers, butadiene rubbers, and isoprene rubbers.

Examples of the ethylene-propylene rubbers include random copolymers containing, as main components, ethylene and propylene; and random copolymers containing, as main components, ethylene and propylene to which a diene monomer, such as dicyclopentadiene or ethylidene norbornene, is added as a third component.

Examples of the butadiene rubber include styrene-butadiene block copolymers, styrene-ethylene-butadiene-styrene copolymers which are hydrogenated or partially hydrogenated derivatives of the styrene-butadiene block copolymers, 1,2-polybutadiene, maleic anhydride-modified styrene-ethylene-butadiene-styrene copolymers, and modified butadiene rubbers having core-shell structures.

Examples of the isoprene rubber include styrene-isoprene block copolymers, styrene-ethylene-isoprene-styrene copolymers which are hydrogenated or partially hydrogenated derivatives of the styrene-isoprene block copolymers, maleic anhydride-modified styrene-ethylene-isoprene-styrene copolymers, and modified isoprene rubbers having core-shell structures.

(Heat of Fusion of Total Resin Component)

The lower limit of the heat of fusion of the total resin component in the base material layer 10 after being heated at 180° C. for 2 minutes is 80 J/g, preferably 100 J/g, and more preferably 110 J/g. The upper limit of the heat of fusion of the total resin component is 150 J/g, preferably 145 J/g, and more preferably 140 J/g. When the base material layer 10 has a high content of a rubber component or an elastomer component, the heat of fusion becomes less than the lower limit. When the heat of fusion is less than the lower limit and the heat-recoverable article 1 is used in a use environment at about 120° C. in a state where a local stress is applied to the base material layer 10 due to a change in the temperature environment during use, tearing and breaking easily occur in the base material layer 10 due to local stress concentration. In contrast, when the base material layer 10 has a high content of a crystalline polyolefin-based resin and a low content of an amorphous polyolefin-based resin such as a rubber component or an elastomer component, the heat of fusion exceeds the upper limit. When the heat of fusion exceeds the upper limit, the shrinkage temperature may increase.

(Storage Modulus at 120° C.)

The lower limit of the storage modulus at 120° C. in the base material layer 10 after being heated at 180° C. for 2 minutes is 4 MPa, preferably 8 MPa, and more preferably 10 MPa. Since the storage modulus is the lower limit or more, even when the heat-recoverable article 1 is used in a use environment at about 120° C. in a state where a stress is locally applied to the base material layer 10 of the heat-recoverable article 1 due to a change in the temperature environment during use of the heat-recoverable article 1, the heat-recoverable article 1 has such a rigidity that the heat-recoverable article 1 can withstand such a local stress load. When the storage modulus is less than the lower limit and the heat-recoverable article 1 is used in a use environment at about 120° C. in a state where a stress is locally applied to the base material layer 10 of the heat-recoverable article 1 due to a change in the temperature environment during use of the heat-recoverable article 1, tearing and breaking easily occur in the base material layer 10.

(Gel Fraction)

The lower limit of the gel fraction in the base material layer 10 after being heated at 180° C. for 2 minutes is 40% by mass, preferably 45% by mass, and more preferably 55% by mass. The upper limit of the gel fraction is 80% by mass, preferably 77% by mass, and more preferably 75% by mass. When the gel fraction is less than the lower limit, a sufficient shrinking rate may not be obtained during heat shrinkage. When the gel fraction exceeds the upper limit, tearing may occur at an end portion during heat shrinkage.

(Storage Modulus at 180° C.)

The lower limit of the storage modulus at 180° C. in the base material layer 10 after being heated at 180° C. for 2 minutes is 0.5 MPa, preferably 0.8 MPa, and more preferably 1.2 MPa. The storage modulus at 180° C. is less than 3.0 MPa, and the upper limit thereof is preferably 2.9 MPa, and more preferably 2.8 MPa. When the storage modulus at 180° C. is less than the lower limit, the rate during heat shrinkage may decrease. When the storage modulus at 180° C. exceeds the upper limit, tearing may easily occur.

(Shrinking Rate)

A time until a heat shrinkage ratio of the base material layer 10 reaches 80% after the heat-recoverable article before heat shrinkage is placed in an atmosphere at 200° C. is preferably less than 50 seconds, more preferably less than 47 seconds, and still more preferably less than 45 seconds from the viewpoint of further enhancing heat shrinkability.

The shrinking rate can be determined as a time [sec] until a heat shrinkage ratio reaches 80% by, for example, thermally shrinking a heat-recoverable article using a thermo-mechanical analysis (TMA) apparatus while continuously measuring the heat shrinkage ratio thereof. Specifically, a portion (tube strip) of a heat-shrinkable tube (base material layer alone) before heat shrinkage is cut out and placed in a TMA apparatus set to a temperature of 200° C. Next, a change in the thickness of the heat-shrinkable tube is measured with time while applying a constant load (for example, 0.02 N). The heat shrinkage ratio is determined by formula (2) below:

$$\text{Heat shrinkage ratio (\%)}=100-(A-B)/(A-C)\times 100 \qquad (2)$$

where A [mm] represents a wall thickness of a heat-recoverable article that has been completely shrunk, B [mm] represents a wall thickness of the heat-recoverable article at a certain time in the course of shrinkage, and C [mm] represents a wall thickness of the heat-recoverable article before heat shrinkage.

Note that, in the base material layer 10 before being heated at 180° C. for 2 minutes, the melting-point peak temperature, the heat of fusion of the total resin component, the storage modulus at 120° C., the gel fraction, and the storage modulus at 180° C. are respectively assumed to be the same as the melting-point peak temperature, the heat of fusion of the total resin component, the storage modulus at 120° C., the gel fraction, and the storage modulus at 180° C. in the base material layer 10 after being heated at 180° C. for 2 minutes.

The polyolefin-based resin is preferably a mixture of a first polyolefin-based resin having a melting point of 125° C. or higher and 135° C. or lower, and a second polyolefin-based resin having a melting point of lower than 125° C. from the viewpoint of more easily and reliably adjusting the melting-point peak temperature, the heat of fusion of the total resin component, the storage modulus at 120° C., the gel fraction, and the storage modulus at 180° C. of the base material layer 10 to the ranges described above.

(First Polyolefin-Based Resin)

The first polyolefin-based resin is preferably a high-density polyethylene from the viewpoint of more easily and reliably adjusting the melting-point peak temperature, the heat of fusion of the total resin component, the storage modulus at 120° C., the gel fraction, and the storage modulus at 180° C. of the base material layer 10 to the ranges described above.

The upper limit of the melt flow rate (MFR) of the high-density polyethylene is preferably 5 g/10 min, more preferably 3 g/10 min, and still more preferably 1 g/10 min. When the MFR exceeds the upper limit, a decrease in transparency due to crystallization may occur in the base material layer 10.

The lower limit of the density of the high-density polyethylene is preferably 0.930 g/cm$^3$, more preferably 0.935 g/cm$^3$, and still more preferably 0.940 g/cm$^3$. The upper limit of the density is preferably 0.960 g/cm$^3$, and more preferably 0.958 g/cm$^3$. When the density is less than the lower limit and the heat-recoverable article 1 is used in a use environment at about 120° C. in a state where a stress is locally applied to the base material layer 10 of the heat-recoverable article 1 due to a change in the temperature environment during use, tearing and breaking easily occur in the base material layer 10 due to a decrease in the melting point of the base material layer 10. When the density exceeds the upper limit, the polyethylene is easily highly crystallized and crosslinking becomes nonuniform, and thus sufficient crosslinking properties may not be obtained.

(Second Polyolefin-Based Resin)

The second polyolefin-based resin is preferably a linear low-density polyethylene, a low-density polyethylene, a very low-density polyethylene, a polyolefin-based elastomer, or a combination thereof from the viewpoint of more easily and reliably adjusting the melting-point peak temperature, the heat of fusion of the total resin component, the storage modulus at 120° C., the gel fraction, and the storage modulus at 180° C. of the base material layer 10 to the ranges described above. In particular, the polyolefin-based elastomer is preferably a polyethylene-based elastomer obtained by copolymerizing ethylene with at least any of butene, hexene, and octene or an ethylene-propylene copolymer elastomer.

The lower limit of the Mooney viscosity of the polyolefin-based elastomer at 100° C. is preferably 10, more preferably 25, and still more preferably 30 from the viewpoint of improving crosslinking properties of the base material layer 10. The improvement in the crosslinking properties contributes to an improvement in the effect of suppressing tearing and an improvement in stability in long-term use.

In the mixture of the first polyolefin-based resin and the second polyolefin-based resin, the lower limit of the mass ratio of the first polyolefin-based resin to the second polyolefin-based resin is preferably 20/80, more preferably 30/70, and still more preferably 40/60.

The upper limit of the mass ratio is preferably 85/15, more preferably 83/17, and still more preferably 80/20. When the mass ratio is within the above range, the melting-point peak temperature, the heat of fusion of the total resin component, the storage modulus at 120° C., the gel fraction, and the storage modulus at 180° C. of the base material layer 10 can be adjusted to the above ranges more easily and reliably.

(Flame Retardant)

Examples of the flame retardant include:

chlorine-based flame retardants such as chlorinated paraffin, chlorinated polyethylene, chlorinated polyphenyl, and perchloropentacyclodecane;

bromine-based flame retardants such as 1,2-bis(2,3,4,5,6-pentabromophenyl)ethane, ethylenebispentabromobenzene, ethylenebispentabromodiphenyl, tetrabromoethane, tetrabromobisphenol A, hexabromobenzene, decabromobiphenyl ether, tetrabromophthalic anhydride, polydibromophenylene oxide, hexabromocyclodecane, ammonium bromide, and dibromoneopentyl glycol;

phosphoric acid esters or phosphorus compounds such as triallyl phosphate, alkyl allyl phosphates, alkyl phosphates, dimethyl phosphonate, phosphinates, halogenated phosphinate esters, trimethyl phosphate, tributyl phosphate, trioctyl phosphate, tributoxyethyl phosphate, octyl diphenyl phosphate, tricresyl phosphate, cresyl phenyl phosphate, triphenyl phosphate, tris(chloroethyl) phosphate, tris(2-chloropropyl) phosphate, tris(2,3-dichloropropyl) phosphate, tris (2,3-dibromopropyl) phosphate, tris(bromochloropropyl) phosphate, bis(2,3-dibromopropyl) 2,3-dichloropropyl phosphate, bis(chloropropyl)monooctyl phosphate, polyphosphonate, polyphosphates, aromatic polyphosphates, and aluminum tris(diethylphosphinate);

polyols such as phosphonate polyols, phosphate polyols, and halogen elements;

metal powders or inorganic compounds such as aluminum hydroxide, magnesium hydroxide, magnesium carbonate, antimony trioxide, antimony trichloride, zinc borate, antimony borate, boric acid, antimony molybdate, molybdenum oxide, phosphorus/nitrogen compounds, calcium/aluminum silicate, zirconium compounds, tin compounds, dawsonite, calcium aluminate hydrate, copper oxide, copper metal powders, calcium carbonate, and barium metaborate;

nitrogen compounds such as melamine cyanurate, triazine, isocyanurates, urea, and guanidine; and other compounds such as silicone-based polymers, ferrocene, fumaric acid, and maleic acid. These flame retardants may be used alone or in combination of two or more thereof.

Of these, halogen-based flame retardants such as bromine-based flame retardants and chlorine-based flame retardants are preferable as the flame retardants.

The lower limit of the content of the bromine-based flame retardant is preferably 1 part by mass, and more preferably 5 parts by mass relative to 100 parts by mass of the polyolefin-based resin. The upper limit of the content is preferably 50 parts by mass, and more preferably 40 parts by mass relative to 100 parts by mass of the polyolefin-based resin. The lower limit of the total flame retardant content is preferably 1 part by mass, and more preferably 5 parts by mass relative to 100 parts by mass of the polyolefin-based resin. The upper limit of the total flame retardant content is preferably 100 parts by mass, and more preferably 80 parts by mass relative to 100 parts by mass of the polyolefin-based resin. When the content of the bromine-based flame retardant or the total flame retardant content is less than the lower limit, the effect of providing flame retardancy may not be obtained. When the content of the bromine-based flame retardant or the total flame retardant content exceeds the upper limit, toughness or elongation necessary for the heat-recoverable article may decrease.

<Oxidation Inhibitor>

The oxidation inhibitor is preferably a phenol-based oxidation inhibitor or an amine-based oxidation inhibitor. By using such an oxidation inhibitor, resistance to damage by copper can be improved. As the oxidation inhibitor, besides the above oxidation inhibitors, sulfur-based oxidation inhibitors, phosphite ester-based oxidation inhibitors, and the like may be used alone or in combination.

(Phenol-Based Oxidation Inhibitor)

Examples of the phenol-based oxidation inhibitor include pentaerythritol tetrakis[3-3,5-di-tert-butyl-4-hydroxyphenyl)propionate], tetrakis-[methylene-3-(3'5'-di-tert-butyl-4'-hydroxyphenyl)propionate]methane, triethylene glycol-bis [3-(3-tert-butyl-5-methyl-4-hydroxyphenyl) propionate], and 6-(4-hydroxy-3,5-di-tert-butyl.anilino)-2,4-bis.octyl-thio-1,3,5-triazine.

(Amine-Based Oxidation Inhibitor)

Examples of the amine-based oxidation inhibitor include 4,4'-(α,α-dimethylbenzyl)diphenylamine, polymerized products of 2,2,4-trimethyl-1,2-dihydroquinoline, 6-ethoxy-2,2,4-trimethyl-1,2-dihydroquinoline, N-(1,3-dimethylbutyl)-N'-phenyl-1,4-phenylenediamine, and N-isopropyl-N'-phenyl-1,4-phenylenediamine.

The lower limit of the content of the oxidation inhibitor in the base material layer 10 is preferably 0.1 parts by mass, and more preferably 1.5 parts by mass relative to 100 parts by mass of the polyolefin-based resin. The upper limit of the content of the oxidation inhibitor is preferably 5 parts by mass, and more preferably 3 parts by mass relative to 100 parts by mass of the polyolefin-based resin. When the content is less than the lower limit, the base material layer 10 is easily oxidized, and the heat-recoverable article 1 may degrade. When the content exceeds the upper limit, the oxidation inhibitor migrates to the surface of the base material layer 10. Consequently, so-called blooming, in which the oxidation inhibitor is crystallized on a surface, and so-called bleeding, in which the oxidation inhibitor bleeds into a surface in the form of liquid, occur, which may result in appearance defects.

(Copper Inhibitor)

Examples of the copper inhibitor include 3-(N-salicyloyl) amino-1,2,4-triazole, decamethylenedicarboxylic acid disalicyloylhydrazide, and 2,3-bis[3-(3,5-di-tert-butyl-4-hydroxyphenyl)propionyl]propionohydrazide. It is expected that damage by copper is prevented by incorporating the copper inhibitor in the base material layer 10.

Regarding the range of the content of the copper inhibitor, for example, in the case where the copper inhibitor is 3-(N-salicyloyl)amino-1,2,4-triazole, the lower limit is preferably 0.1 parts by mass, and more preferably 1 part by mass relative to 100 parts by mass of the polyolefin-based resin. The upper limit is preferably 10 parts by mass, and more preferably 5 parts by mass relative to 100 parts by mass of the polyolefin-based resin. When the content of the copper inhibitor is less than the lower limit, the effect of the copper inhibitor may not be obtained. When the content of the copper inhibitor exceeds the upper limit, an improvement in the effect of preventing damage by copper is not obtained.

<Method for Manufacturing Heat-Recoverable Article>

The heat-recoverable article 1 can be manufacturing by, for example, a manufacturing method including the following steps.

(1) A step of molding a resin composition containing the polyolefin-based resin described above so as to have a cylindrical shape.

(2) A step of forming a base material layer 10 by expanding a diameter of the molded body.

The resin composition is preferably a resin composition capable of providing a base material layer in which the gel fraction after being heated at 180° C. for 2 minutes is within the above range from the viewpoint of suppressing the occurrence of nonuniformity in the thickness and suppressing the occurrence of tearing during molding and expansion in diameter. Furthermore, the resin composition is preferably a resin composition capable of providing a base material layer in which the storage modulus at 180° C. after being heated at 180° C. for 2 minutes is within the above range from the viewpoint of efficiently manufacturing a cylindrical molded body in the step of molding and suppressing the occurrence of tearing during molding and expansion in diameter.

(Preparation of Composition)

The polyolefin-based resin composition can be prepared by mixing a resin component such as the polyolefin-based resin and the additives, which are optionally added, using a melt-mixer. Examples of the melt-mixer include known melt-mixers such as an open roll mixer, a Banbury mixer, a pressure kneader, a single-screw mixer, and a multi-screw mixer.

(Step of Molding)

The molded body is formed by, for example, extruding the polyolefin-based resin composition using a known melt-extruder. In this molded body, the material constituting the base material layer is crosslinked to improve heat resistance.

Examples of the crosslinking method include crosslinking by irradiation with ionizing radiation, chemical crosslinking, and thermal crosslinking.

Examples of the ionizing radiation include α rays, β lays, γ rays, electron beams, and X-rays. Of these, an electron beam is preferred as the ionizing radiation from the viewpoint of the ease of control, the safety, and the like.

The dose of the ionizing radiation is not particularly limited. For example, when an electron beam is applied as the ionizing radiation, the dose thereof is preferably 100 kGy or more and 1,000 kGy or less from the viewpoint of suppressing degradation of resins due to irradiation while obtaining a sufficient crosslinking density.

The dimensions of the molded body can be designed in accordance with the use etc. Regarding the dimensions of the molded body corresponding to the base material layer 10, for example, the inner diameter and the wall thickness are 1.0 mm or more and 30 mm or less and 0.1 mm or more and 10 mm or less, respectively.

(Step of Expanding Diameter)

The expansion of the diameter of the molded body is performed by heating the molded body to a temperature equal to or higher than the melting point, in that state, inflating the molded body so as to have a predetermined inner diameter by a method of introducing compressed air thereinto, or the like, and subsequently conducting cooling to fix the shape. Such an expansion of the diameter is performed such that, for example, the inner diameter of the molded body is increased by about 2 to 4 times. By expanding the diameter of the molded body and fixing the shape in such a manner, a heat-recoverable article is obtained.

[Advantages]

In the base material layer 10 after being heated at 180° C. for 2 minutes, the melting-point peak temperature is within the above range, the heat of fusion of the total resin component is within the above range, the storage modulus at 120° C. is equal to or more than the above value, the gel fraction is within the above range, and the storage modulus at 180° C. is within the above range. Accordingly, the heat-recoverable article 1 has good manufacturability and good shrinkability at relatively low temperatures such as 130° C. or higher and 140° C. or lower. In addition, even when the heat-recoverable article 1 is used in a use environment at about 120° C. in a state where a stress is locally applied to the base material layer 10 of the heat-recoverable article 1 due to a change in the temperature environment during use of the heat-recoverable article 1, the heat-recoverable article 1 has such a rigidity that the heat-recoverable article 1 can withstand such a local stress load. Even when the heat-recoverable article 1 is used in a wide temperature environment in a range from about −60° C. to about 120° C., the occurrence of tearing and breaking can be effectively suppressed. Therefore, the heat-recoverable article 1 has good manufacturability and good usability.

Second Embodiment

Figure 4:
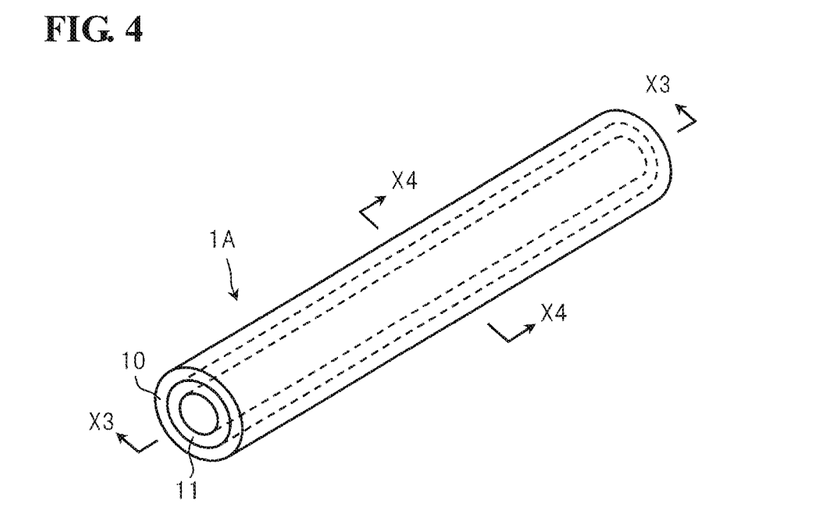
FIG. 4 is a schematic perspective view illustrating a heat-recoverable article according to a second embodiment of the present invention.
Figure 5:
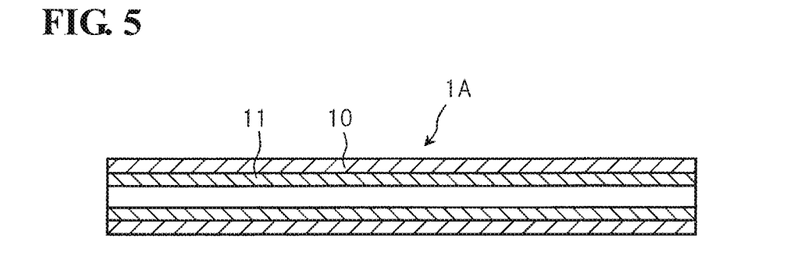
FIG. 5 is a schematic sectional view taken along line X3-X3 in FIG. 4.
Figure 6:
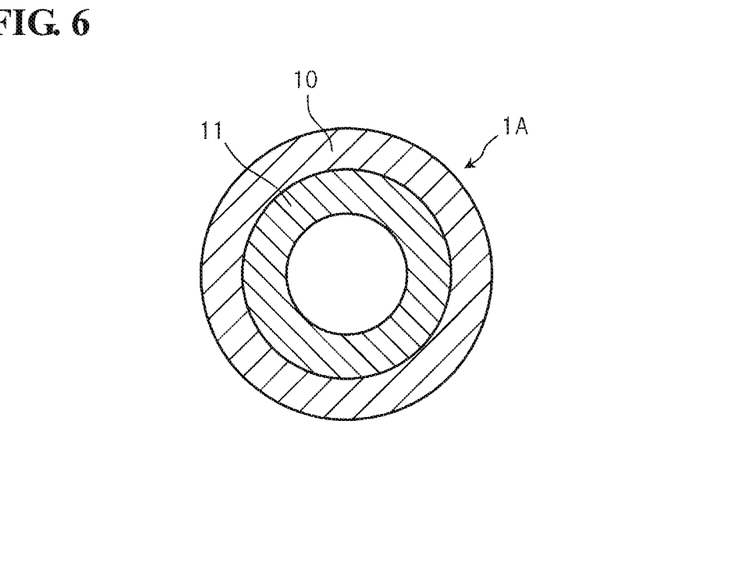
FIG. 6 is a schematic sectional view taken along line X4-X4 in FIG. 4.

FIGS. 4 to 6 each illustrate a heat-recoverable article 1A of a second embodiment. In this heat-recoverable article 1A, components the same as those of the heat-recoverable article 1 of the first embodiment are assigned the same reference numerals, and a description of the components is omitted. The heat-recoverable article 1A of the second embodiment is a multilayered heat-recoverable article including an adhesive layer 11 formed on an inner circumferential surface of a base material layer 10.

<Adhesive Layer>

The adhesive layer 11 preferably contains an ethylene-vinyl acetate copolymer or a polyamide. The adhesive layer 11 is a layer for enhancing adhesiveness between the base material layer 10 and a cover portion to be covered with the heat-recoverable article 1A and improving a waterproof property, etc. An inorganic filler may be added to the adhesive layer 11 for the purpose of adjusting the viscosity after the adhesive layer 11 is formed in the heat-recoverable article 1A. Furthermore, other additives may be added to the adhesive layer 11, as required. Examples of the additives include an oxidation inhibitor, a copper inhibitor, a deterioration inhibitor, a viscosity improver, a flame retardant, a lubricant, a coloring agent, a heat stabilizer, an ultraviolet absorber, and a gluing agent.

(Ethylene-Vinyl Acetate Copolymer)

The lower limit of the content of vinyl acetate in the ethylene-vinyl acetate copolymer is preferably 12% by mass, more preferably 15% by mass, and still more preferably 19% by mass. The upper limit of the content is preferably 46% by mass, more preferably 35% by mass, and still more preferably 30% by mass. When the content is less than the lower limit, sufficient flexibility may not be obtained. When the content exceeds the upper limit and the adhesive layer 11 is formed by extrusion molding, sticking to a die, a metal mold, or the like may occur, resulting in a difficulty in handling.

The lower limit of the MFR of the ethylene-vinyl acetate copolymer is preferably 50 g/10 min, and more preferably 100 g/10 min. The upper limit of the MFR is preferably 600 g/10 min, and more preferably 500 g/10 min. When the MFR is less than the lower limit and the adhesive layer 11 is formed by extrusion molding, a relatively high pressure may be necessary.

When the MFR exceeds the upper limit, the resin excessively flows and it may become difficult to form the adhesive layer 11 having a uniform shape.

(Inorganic Filler)

Examples of the inorganic filler include organically treated layered silicates, organically treated swelling mica, calcium carbonate, carbon, and silica. By incorporating the inorganic filler, the viscosity of the adhesive layer 11 can be easily adjusted and the thickness of the adhesive layer 11 can be made uniform.

<Method for Manufacturing Heat-Recoverable Article>

The heat-recoverable article 1A can be manufactured by, for example, a manufacturing method including the following steps.

(1) A step of molding a resin composition containing the polyolefin-based resin composition described above and an adhesive composition so as to have a cylindrical shape.

(2) A step of forming a base material layer and an adhesive layer by expanding a diameter of the molded body.

Note that the term "adhesive composition" refers to a composition for forming the adhesive layer 11.

The polyolefin-based resin composition used may be the same as the polyolefin-based resin composition of the first embodiment.

(Preparation of Composition)

The polyolefin-based resin composition can be prepared by mixing a resin component such as the polyolefin-based resin and the additives, which are optionally added, using a melt-mixer. Examples of the melt-mixer include known melt-mixers such as an open roll mixer, a Banbury mixer, a pressure kneader, a single-screw mixer, and a multi-screw mixer.

The adhesive composition can be prepared by mixing, for example, an ethylene-vinyl acetate copolymer or a polyamide, and optionally, an additive using a melt-mixer. The same melt-mixer as that used in the preparation of the polyolefin-based resin composition can be used as the melt-mixer.

(1) Step of Molding (Step of Forming Multilayered Extrusion-Molded Body)

In the step of molding, the polyolefin-based resin composition and the adhesive composition are simultaneously extruded by using a known melt-extruder to form a multilayered extrusion-molded body in which an inner layer corresponding to the adhesive layer 11 is formed on the inner circumferential surface of an outer layer corresponding to the base material layer 10. In this multilayered extrusion-molded body, the material constituting the outer layer may be crosslinked to improve heat resistance. Examples of the crosslinking method include crosslinking by irradiation with ionizing radiation, chemical crosslinking, and thermal crosslinking.

Specific examples and the dose of the ionizing radiation are the same as those in the first embodiment.

The dimensions of the multilayered extrusion-molded body can be designed in accordance with the use etc. Regarding the dimensions of the layer corresponding to the base material layer 10 of the multilayered extrusion-molded body, for example, the inner diameter and the wall thickness are 1.0 mm or more and 30 mm or less and 0.1 mm or more and 10 mm or less, respectively. Regarding the dimensions of the layer corresponding to the adhesive layer 11 of the multilayered extrusion-molded body, for example, the inner diameter and the wall thickness are 0.1 mm or more and 10 mm or less and 0.1 mm or more and 8.5 mm or less, respectively.

(2) Step of Expanding Diameter (Step of Expanding Diameter of Multilayered Extrusion-Molded Body)

In the step of expanding the diameter, expansion of the diameter of the multilayered extrusion-molded body is performed. The expansion of the diameter of the multilayered extrusion-molded body is performed by heating the multilayered extrusion-molded body to a temperature equal to or higher than the melting point, in that state, inflating the multilayered extrusion-molded body so as to have a predetermined inner diameter by a method of introducing compressed air thereinto, or the like, and subsequently conducting cooling to fix the shape.

Such an expansion of the diameter of the multilayered extrusion-molded body is performed such that, for example, the inner diameter of the multilayered extrusion-molded body is increased by about 2 to 4 times. By expanding the diameter of the multilayered extrusion-molded body and fixing the shape in such a manner, a heat-recoverable article 1A is obtained.

[Advantages]

Since the heat-recoverable article 1A includes the base material layer 10, the heat-recoverable article 1A has good manufacturability and good shrinkability at relatively low temperatures such as 130° C. or higher and 140° C. or lower. In addition, even when the heat-recoverable article 1A is used in a use environment at about 120° C. in a state where a stress is locally applied to the base material layer 10 of the heat-recoverable article 1A due to a change in the temperature environment during use of the heat-recoverable article 1A, the heat-recoverable article 1A has such a rigidity that the heat-recoverable article 1A can withstand such a local stress load. Even when the heat-recoverable article 1A is used in a wide temperature environment in a range from about −60° C. to about 120° C., the occurrence of tearing and breaking can be effectively suppressed. Therefore, the heat-recoverable article 1A has good manufacturability and good usability. Furthermore, since the heat-recoverable article 1A includes the adhesive layer 11, adhesiveness between the base material layer 10 and a portion to be covered with the heat-recoverable article 1A can be enhanced to improve an insulation property, a waterproof property, an anticorrosion property, etc.

[Wire Splice and Wire Harness]

The heat-recoverable article can be used for, for example, protection, insulation, waterproofing, and corrosion protection of wires such as a polyethylene (PE) electrical wire or PE cable that includes an insulating layer formed of PE, and a polyvinyl chloride (PVC) electrical wire or PVC cable that includes an insulating layer formed of PVC, the insulating layers covering conductors. Specifically, the heat-recoverable article can be applied to a wire splice and a wire harness.

Figure 7:
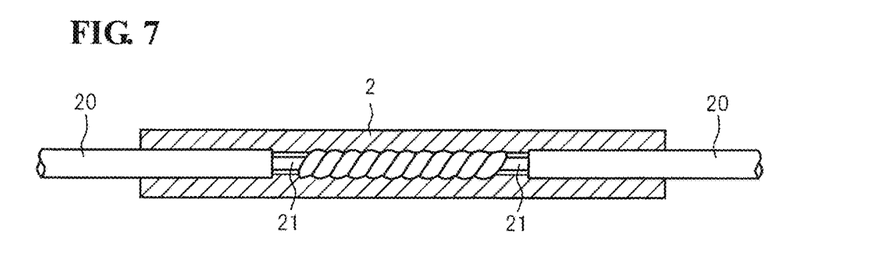
FIG. 7 is a schematic sectional view illustrating a wire splice according to an embodiment of the present invention, the sectional view corresponding to FIG. 2.
Figure 8:
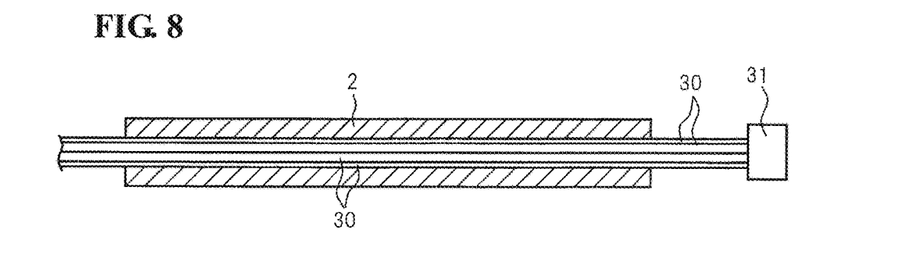
FIG. 8 is a schematic sectional view illustrating a wire harness according to an embodiment of the present invention, the sectional view corresponding to FIG. 2.
Figure 9:
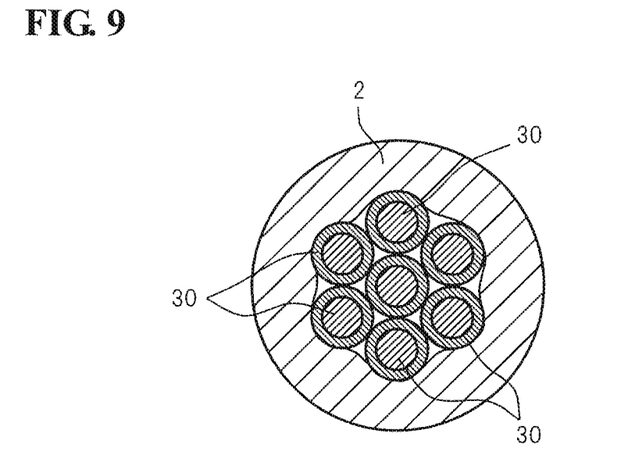
FIG. 9 is a schematic sectional view of the wire harness illustrated in FIG. 8, the sectional view corresponding to FIG. 3.

FIG. 7 illustrates an example in which the heat-recoverable article is applied to a wire splice. FIGS. 8 and 9 illustrate an example in which the heat-recoverable article is applied to a wire harness.

The wire splice illustrated in FIG. 7 is obtained by stranding conductor wires 21 of a pair of wires 20 to connect to each other, and causing a tube 2 to adhere to the connected portion, the tube 2 being formed by thermally shrinking the heat-recoverable article 1 or the heat-recoverable article 1A. Each of the wires 20 is a cable or an insulated electrical wire such as a PE electrical wire or a PVC electrical wire. For example, a wire that includes an insulating layer containing polyvinyl chloride as a main component and located as an outermost layer is used as the wire 20. The content of polyvinyl chloride in the insulating layer is, for example, 50% by mass or more and 95% by mass or less. In this wire splice, the tube 2 can contribute to, for example, protection, insulation, waterproofing, and corrosion protection of the connected portion.

The wire harness illustrated in FIGS. 8 and 9 is obtained by bundling a plurality of wires 30 together with a tube 2 formed by thermally shrinking the heat-recoverable article 1 or the heat-recoverable article 1A, and providing a multi-pin connector 31 at the ends of the plurality of wires 30. The wires 30 are the same as the wires 20 of the wire splice described above. In this wire harness, the tube 2 has not only a function of bundling the wires 30 together but also a function of protecting each of the wires 30 and other functions.

It should be noted that the wire splice and the wire harness may not be exactly discriminated from each other. There may be a case where a wire splice also functions as a wire harness.

Other Embodiments

It is to be understood that the embodiments disclosed herein are only illustrative and are not restrictive in all respects. The scope of the present invention is not limited to the configurations of the embodiments and is defined by the claims described below. The scope of the present invention is intended to cover all the modifications within the meaning and the scope of equivalents of the claims.

Figure 10:
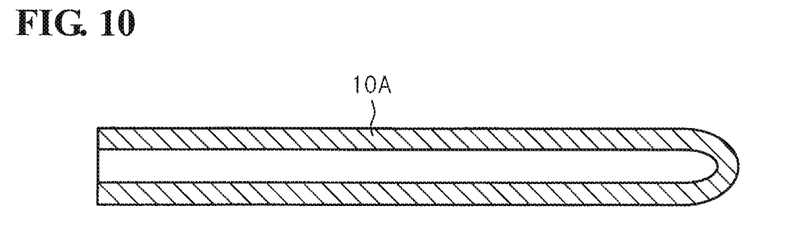
FIG. 10 is a schematic sectional view illustrating a heat-recoverable article according to another embodiment of the present invention, the sectional view corresponding to FIG. 2.

The heat-recoverable article is not limited to the heat-recoverable articles illustrated in FIGS. 1 to 6. Alternatively, for example, the heat-recoverable article may have a cylindrical shape and include a base material layer 10A formed so that one end thereof is open and the other end has a cap shape, as illustrated in FIG. 10. This heat-recoverable article is obtained by thermally shrinking one end of the heat-recoverable article 1 illustrated in FIG. 1 to close the one end. This heat-recoverable article can be suitably used for, for example, a wire terminal treatment.

The heat-recoverable article 1A of the second embodiment may be manufactured by separately performing extrusion molding to separately form the base material layer 10 and the adhesive layer 11. The heat-recoverable article in this case is used by arranging an adhesive layer inside a base material layer that has been inflated after extrusion molding, causing the resulting adhesive layer to adhere to an adherend, and thermally shrinking the base material layer.

The wire splice may be any wire splice as long as a heat-recoverable article is caused to adhere to a connected portion between wires. In the wire splice, a single wire may be connected to a plurality of wires, a plurality of wires may be connected to a plurality of wires, or ends of a plurality of wires may be integrally connected together, as in a wire terminal treatment. Alternatively, other configurations may be used.

The wire harness may be configured as a so-called flat harness in which a plurality of wires are bundled together in a planar shape. Alternatively, other configurations may be used.

EXAMPLES

The present invention will now be described more specifically using Examples. However, the present invention is not limited to the Examples described below.

Test Examples

Heat-recoverable articles of Test Examples were manufactured by varying the structure and dimensions of a base material layer, the presence or absence of an adhesive layer, and the dose of an electron beam. Specifically, the heat-recoverable articles were manufactured so as to have the structures shown in Tables 1 through the step of forming an extrusion-molded body, and the step of, after the formation of the extrusion-molded body, irradiating the extrusion-molded body with an electron beam and expanding the diameter.

In Test Examples 1 to 10, 12, and 14 to 16, the outer diameter of the layer corresponding to the base material layer of the extrusion-molded body was set to 6.8 mm, the inner diameter thereof was set to 5 mm, and the wall thickness thereof was set to 0.9 mm. Subsequently, in the step of expanding the diameter, the diameter of the extrusion-molded body was expanded such that the inner diameter became 15 mm, and the wall thickness became 0.45 mm. The heat-recoverable articles were manufactured in this manner. The heat-recoverable articles each had a length of 5 cm or more and 10 cm or less.

In Test Examples 11, 13, and 17, the heat-recoverable articles had nonuniform thicknesses. Furthermore, in Test Examples 11, 13, and 17, extrusion in the step of forming an extrusion-molded body was unstable, and inflation in the step of expanding the diameter was unstable in some cases. Consequently, heat-recoverable articles having long lengths could not be obtained.

TABLE 1

| | | | \multicolumn{9}{c}{Test Example} |
|---|---|---|---|---|---|---|---|---|---|---|---|
| | | | 1 | 2 | 3 | 4 | 5 | 6 | 7 | 8 | 9 |
| Base material layer | Composition [parts by mass] | HDPE1 | 50 | 85 | 20 | 50 | 60 | 60 | 80 | 50 | 50 |
| | | HDPE2 | — | — | — | — | — | — | — | — | — |
| | | HDPE3 | — | — | — | — | — | — | — | — | — |
| | | LLDPE | 50 | 15 | 80 | — | — | — | — | 40 | 50 |
| | | LDPE | — | — | — | 50 | — | — | — | — | — |
| | | VLDPE1 | — | — | — | — | 40 | — | — | — | — |
| | | VLDPE2 | — | — | — | — | — | 40 | — | — | — |
| | | EPR | — | — | — | — | — | — | 20 | 10 | — |
| | Dose [kGy] | | 200 | 200 | 200 | 200 | 200 | 200 | 200 | 200 | 200 |
| | Wall thickness [mm] | Before shrinkage | 0.45 | 0.45 | 0.45 | 0.45 | 0.45 | 0.45 | 0.45 | 0.45 | 0.45 |
| | | After shrinkage | 0.9 | 0.9 | 0.9 | 0.9 | 0.9 | 0.9 | 0.9 | 0.9 | 0.9 |
| | Melting-point peak temperature [° C.] | | 123 | 128 | 115 | 123 | 121 | 120 | 123 | 121 | 123 |
| | Heat of fusion [J/g] | | 130 | 150 | 90 | 120 | 120 | 116 | 135 | 126 | 130 |
| | Storage modulus at 120° C. [MPa] | | 16 | 24 | 4 | 14 | 13 | 13 | 22 | 12 | 16 |
| | Storage modulus at 180° C. [MPa] | | 0.8 | 0.6 | 1 | 0.9 | 0.9 | 1.8 | 1.3 | 2.6 | 0.8 |
| | Gel fraction [% by mass] | | 51 | 48 | 54 | 52 | 53 | 68 | 62 | 71 | 51 |
| | Shrinking rate [sec] | | 65 | 70 | 55 | 60 | 55 | 40 | 45 | 40 | 60 |
| Adhesive layer | | | Present | Present | Present | Present | Present | Present | Present | Present | Absent |
| Tear suppression performance | | | A | A | A | A | A | A | A | A | A |

| | | | \multicolumn{8}{c}{Test Example} |
|---|---|---|---|---|---|---|---|---|---|---|
| | | | 10 | 11 | 12 | 13 | 14 | 15 | 16 | 17 |
| Base material layer | Composition [parts by mass] | HDPE1 | 50 | 90 | — | — | — | — | 20 | 30 |
| | | HDPE2 | — | — | 60 | — | — | — | — | — |
| | | HDPE3 | — | — | — | 60 | — | — | — | — |
| | | LLDPE | 50 | — | 40 | 40 | 100 | — | — | — |
| | | LDPE | — | — | — | — | — | 100 | — | — |
| | | VLDPE1 | — | — | — | — | — | — | 80 | — |
| | | VLDPE2 | — | — | — | — | — | — | — | — |
| | | EPR | — | 10 | — | — | — | — | — | 70 |
| | Dose [kGy] | | 400 | 200 | 209 | 200 | 200 | 200 | 200 | 200 |
| | Wall thickness [mm] | Before shrinkage | 0.45 | * | 0.45 | * | 0.45 | 0.45 | 0.45 | * |
| | | After shrinkage | 0.9 | * | 0.9 | * | 0.9 | 0.9 | 0.9 | * |
| | Melting-point peak temperature [° C.] | | 122 | 129 | 126 | 131 | 122 | 110 | 108 | 105 |
| | Heat of fusion [J/g] | | 125 | 160 | 156 | 160 | 110 | 90 | 75 | 60 |
| | Storage modulus at 120° C. [MPa] | | 16 | 26 | 15 | 16 | 1.5 | 1 | 1 | 1 |
| | Storage modulus at 180° C. [MPa] | | 1.2 | 0.4 | 0.5 | 0.3 | 0.9 | 0.8 | 0.9 | 3.1 |
| | Gel fraction [% by mass] | | 58 | 38 | 45 | 35 | 53 | 52 | 53 | 82 |
| | Shrinking rate [sec] | | 50 | 95 | 85 | 110 | 60 | 60 | 55 | 35 |
| Adhesive layer | | | Present | Present | Present | Present | Present | Present | Present | Present |
| Tear suppression performance | | | A | A | A | A | B | B | B | B |

In Table 1 above, the symbol "*" represents that the wall thickness is nonuniform.

Table 2 below shows details of the components in Table 1.

TABLE 2

| | Density [g/cm³] | Melting point [° C.] | MFR [g/10 min] | Mooney viscosity |
|---|---|---|---|---|
| High-density polyethylene 1 (HDPE 1) | 0.951 | 130 | 0.8 | — |
| High-density polyethylene 2 (HDPE 2) | 0.961 | 126 | 12 | — |
| High-density polyethylene 3 (HDPE 3) | 0.964 | 136 | 0.3 | — |
| Linear low-density polyethylene (LLDPE) | 0.922 | 122 | 1.2 | — |
| Low-density polyethylene (LDPE) | 0.92 | 110 | 1.4 | — |
| Very low-density polyethylene 1 (VLDPE1) | 0.868 | 55 | 0.5 | 33 |
| Very low-density polyethylene 2 (VLDPE2) | 0.86 | 37 | <0.5 | 47 |
| Ethylene-propylene rubber (EPR) | 0.88 | — | — | 60 |

In Table 2, the melting point was determined as a melting peak temperature measured by using a differential scanning calorimeter in accordance with JIS-K-7121 (1987). The density was measured in accordance with JIS-Z-8807 (2012). The MFR was measured in accordance with JIS-K-7210 (2014) at a temperature of 190° C. and a load of 21.6 kg by using an extrusion plastometer specified in JIS-K-6760. The Mooney viscosity was measured by using a Mooney viscometer at a temperature of 100° C. in accordance with JIS-K-6300-1 (2013). Note that the symbol "-" in the table represents that the measurement was not performed or the measurement could not be performed.

<Melting-Point Peak Temperature, Heat of Fusion of Total Resin Component, Storage Modulus at 120° C., Gel Fraction, Storage Modulus at 180° C., and Shrinking Rate>

Table 1 shows the melting-point peak temperature, heat of fusion of the total resin component, storage modulus at 120° C., gel fraction, storage modulus at 180° C., and shrinking rate in each of the heat-recoverable articles of Test Examples. The methods for measuring these are as follows.

(Melting-Point Peak Temperature)

First, a heat-recoverable article was heated at 180° C. for 2 minutes. For a base material layer of the heat-recoverable article after heating, differential scanning calorimetry was performed with a differential scanning calorimeter ("DSC 8500" available from PerkinElmer Co., Ltd.) in which the temperature was increased from room temperature to 200° C. at 10° C./min. A temperature at which the amount of heat absorption per unit time reaches a maximum in the base material layer during this temperature rise was defined as the melting-point peak temperature [° C.]. This melting-point peak temperature is shown in the field of the "melting-point peak temperature" in Table 1.

(Heat of Fusion of Total Resin Component)

A value determined by dividing the amount of heat absorption [J] of the base material layer during the measurement of the melting-point peak temperature by the mass [g] of the total polyolefin-based resins in the base material layer was defined as the heat of fusion [J/g] of the total resin component.

This heat of fusion of the total resin component is shown in the field of the "heat of fusion" in Table 1.

(Storage Modulus at 120° C.)

First, a heat-recoverable article was heated at 180° C. for 2 minutes. For a base material layer of the heat-recoverable article after heating, dynamic viscoelasticity measurement was performed by using a dynamic viscoelastic analyzer ("DVA-200" available from IT Keisoku Seigyo K.K.) at a temperature rising rate of 10° C./min, and the storage modulus at 120° C. was determined. This storage modulus is shown in the field of the "storage modulus at 120° C." in Table 1.

(Gel Fraction)

First, a heat-recoverable article was heated at 180° C. for 2 minutes. A sample having a weight of 0.1 g was prepared from a base material layer of the heat-recoverable article after heating. This sample having a weight of 0.1 g was immersed in 20 g of xylene and heated at 120° C. for 24 hours. After heating, the resulting xylene solution was recovered and filtered, and insoluble matter remaining on filter paper was collected. Next, this insoluble matter was dried, and the mass of the insoluble matter after drying was represented by W1 [g]. The gel fraction [% by mass] was determined by formula (1') below.

$$\text{Gel fraction[\% by mass]} = W1[g]/0.1 \times 100 \tag{1'}$$

(Storage Modulus at 180° C.)

First, a heat-recoverable article was heated at 180° C. for 2 minutes. For a base material layer of the heat-recoverable article after heating, dynamic viscoelasticity measurement was performed by using a dynamic viscoelastic analyzer ("DVA-200" available from IT Keisoku Seigyo K.K.) at a temperature rising rate of 10° C./min, and the storage modulus at 180° C. was determined. This storage modulus is shown in the field of the "storage modulus at 180° C." in Table 1.

(Shrinking Rate)

A base material layer of a heat-recoverable article before heat shrinkage was placed in a thermomechanical analysis apparatus, and the base material layer was placed in an atmosphere at 200° C. Next, the base material layer was completely thermally shrunk while applying a load of 0.02 N with a probe. A heat shrinkage ratio [%] described below was continuously measured during this heat shrinkage, and the time [sec] until this heat shrinkage ratio reached 80% was measured. This time is shown in the field of the "shrinking rate" in Table 1.

The heat shrinkage ratio was determined by formula (2) below where A [mm] represents a wall thickness of the base material layer that has been completely shrunk, B [mm] represents a wall thickness of the base material layer at a certain time in the course of shrinking, and C [mm] represents a wall thickness of the base material layer before heat shrinkage. The wall thicknesses were determined with a sample deformation measuring sensor provided in the thermomechanical analysis apparatus. Three samples were prepared from different portions of the base material layer, and the measurement was performed for each of the samples. The average was determined as this heat shrinkage ratio.

$$\text{Heat shrinkage ratio (\%)} = 100 - (A-B)/(A-C) \times 100 \tag{2}$$

<Evaluation of Heat-Recoverable Article>

As an evaluation of the heat-recoverable articles of Test Examples, a tear suppression performance was evaluated. The evaluation results are shown in Table 1. The test method is as follows.

(Tear Suppression Performance)

A square iron bar having a section of 10 mm square was covered with a heat-recoverable article, and heating was performed at 180° C. for 2 minutes to thermally shrink the heat-recoverable article. Subsequently, the resulting sample was first maintained at −30° C. for 20 minutes and then maintained at 120° C. for 20 minutes. This heat cycle was performed 100 times. After this test, when no tearing occurred in the heat-recoverable article, the sample was evaluated as "A" (Good). In contrast, when tearing occurred or a small scratch was generated in the heat-recoverable article, the sample was evaluated as "B" (Not good).

As shown in Table 1, regarding each of the heat-recoverable articles of Test Examples 1 to 10, in the base material layer after being heated at 180° C. for 2 minutes, the melting-point peak temperature is within the particular range, the heat of fusion of the total resin component is within the particular range, the storage modulus at 120° C. is the particular value or more, the gel fraction is within the particular range, and the storage modulus at 180° C. is within the particular range. The heat-recoverable articles of Test Examples 1 to 10 each have a high shrinking rate during heat shrinkage and exhibit a good tear suppression performance.

In contrast, regarding each of Test Examples 11 and 13, in the base material layer after being heated at 180° C. for 2 minutes, the melting-point peak temperature and the heat of fusion of the total resin component are excessively high, and the storage modulus at 180° C. and the gel fraction are excessively low. Therefore, the shrinking rate during heat shrinkage is lower than those of Test Examples 1 to 10. Furthermore, in each of Test Examples 11 and 13, the wall thickness was nonuniform, and manufacturability was poor.

Regarding Test Example 12, in the base material layer after being heated at 180° C. for 2 minutes, the heat of fusion of the total resin component is excessively high. Therefore, the shrinking rate during heat shrinkage is lower than those of Test Examples 1 to 10.

Regarding Test Example 14, in the base material layer after being heated at 180° C. for 2 minutes, the storage modulus at 120° C. is excessively low. Regarding Test Example 15, in the base material layer after being heated at 180° C. for 2 minutes, the melting-point peak temperature and the storage modulus at 120° C. are excessively low. Furthermore, regarding Test Example 16, in the base material layer after being heated at 180° C. for 2 minutes, the melting-point peak temperature, the heat of fusion of the total resin component, and the storage modulus at 120° C. are excessively low. Therefore, in each of Test Examples 14 to 16, tearing is not sufficiently suppressed, and tearing easily occurs compared with Test Examples 1 to 10.

Regarding Test Example 17, the melting-point peak temperature, the heat of fusion of the total resin component, and the storage modulus at 120° C. are excessively low, and the storage modulus at 180° C. and the gel fraction are excessively high. Therefore, in Test Example 17, tearing is not sufficiently suppressed, and tearing easily occurs compared with Test Examples 1 to 10. Furthermore, in Test Example 17, the wall thickness was nonuniform, and manufacturability was poor.

INDUSTRIAL APPLICABILITY

The heat-recoverable article according to the present invention has good manufacturability and good shrinkability at relatively low temperatures such as 130° C. or higher and 140° C. or lower, and is capable of effectively suppressing the occurrence of tearing and breaking and has good adhesiveness to an object to be covered even when used in a wide temperature environment from about −60° C. to about 120° C.

Therefore, the heat-recoverable article has good manufacturability and good usability. The heat-recoverable article can be used as a cover for, for example, protection, insulation, waterproofing, and corrosion protection of connected portions between insulated electrical wires, wiring terminals, metal tubes, and the like. In particular, the heat-recoverable article can be suitably used in a wire splice and a wire harness.

REFERENCE SIGNS LIST

1, 1A heat-recoverable article
10, 10A base material layer
11 adhesive layer
2 tube
20 wire
21 conductor wire
30 wire
31 multi-pin connector

The invention claimed is:

1. A heat-recoverable article having a cylindrical shape, the heat-recoverable article comprising a base material layer,
   wherein the base material layer contains a polyolefin-based resin, and
   in the base material layer after being heated at 180° C. for 2 minutes, a melting-point peak temperature is 115° C. or higher and 128° C. or lower, a heat of fusion of a total resin component is 80 J/g or more and 150 J/g or less, a storage modulus at 120° C. is 4 MPa or more, a gel fraction is 40% by mass or more and 80% by mass or less, and a storage modulus at 180° C. is 0.5 MPa or more and less than 3.0 MPa,
   wherein the polyolefin-based resin is a mixture of a first polyolefin-based resin having a melting point of 125° C. or higher and 135° C. or lower and a second polyolefin-based resin having a melting point of lower than 125° C., and a mass ratio of the first polyolefin-based resin to the second polyolefin-based resin is 60/40 or more, and
   wherein the first polyolefin-based resin is a high-density polyethylene.

2. The heat-recoverable article according to claim 1, wherein the high-density polyethylene has a melt flow rate (MFR) of 5 g/10 min or less.

3. The heat-recoverable article according to claim 1, wherein the high-density polyethylene has a density of 0.930 g/cm$^3$ or more and 0.960 g/cm$^3$ or less.

4. The heat-recoverable article according to claim 1, wherein the second polyolefin-based resin is a linear low-density polyethylene, a low-density polyethylene, a very low-density polyethylene, a polyolefin-based elastomer, or a combination thereof.

5. The heat-recoverable article according to claim 4, wherein the polyolefin-based elastomer is a polyethylene-based elastomer obtained by copolymerizing ethylene with at least any of butene, hexene, and octene or an ethylene-propylene copolymer elastomer.

6. The heat-recoverable article according to claim 4, wherein the polyolefin-based elastomer has a Mooney viscosity of 10 or more at 100° C.

7. The heat-recoverable article according to claim 1, wherein a time until a heat shrinkage ratio of the base material layer reaches 80% after the heat-recoverable article is placed in an atmosphere at 200° C. is less than 50 seconds.

8. The heat-recoverable article according to claim 1, comprising an adhesive layer formed on an inner circumferential surface of the base material layer.

9. The heat-recoverable article according to claim 8, wherein the adhesive layer contains an ethylene-vinyl acetate copolymer or a polyamide.

10. A wire splice comprising:
a plurality of wires each of which includes a conductor and an insulating layer formed on the outside of the conductor; and
a tube adhering to a portion where the conductors of the plurality of wires are connected together, the tube being formed by thermally shrinking the heat-recoverable article according to claim 1.

11. A wire harness comprising:
a plurality of wires each of which includes a conductor and an insulating layer formed on the outside of the conductor; and
a tube adhering to the plurality of wires, the tube being formed by thermally shrinking the heat-recoverable article according to claim 1.

12. The heat-recoverable article according to claim 1, wherein the mass ratio of the first polyolefin-based resin to the second polyolefin-based resin is 60/40 or more and 85/15 or less.

13. The heat-recoverable article according to claim 1, wherein the mass ratio of the first polyolefin-based resin to the second polyolefin-based resin is 80/20 or more and 85/15 or less.

14. The heat-recoverable article according to claim 1, wherein the second polyolefin-based resin is a linear low-density polyethylene, a low-density polyethylene, a very low-density polyethylene, or a combination thereof, and
wherein the polyethylene of the second polyolefin-based resin has a melting point of 55° C. or lower.

15. A method for manufacturing a heat-recoverable article, comprising:
a step of molding a resin composition containing a polyolefin-based resin so as to obtain a molded body having a cylindrical shape; and
a step of forming a base material layer by expanding a diameter of the molded body,
wherein in the base material layer after being heated at 180° C. for 2 minutes, a melting-point peak temperature is 115° C. or higher and 128° C. or lower, a heat of fusion of a total resin component is 80 J/g or more and 150 J/g or less, a storage modulus at 120° C. is 4 MPa or more, a gel fraction is 40% by mass or more and 80% by mass or less, and a storage modulus at 180° C. is 0.5 MPa or more and less than 3.0 MPa,
wherein the polyolefin-based resin is a mixture of a first polyolefin-based resin having a melting point of 125° C. or higher and 135° C. or lower and a second polyolefin-based resin having a melting point of lower than 125° C., and a mass ratio of the first polyolefin-based resin to the second polyolefin-based resin is 60/40 or more, and
wherein the first polyolefin-based resin is a high-density polyethylene.

* * * * *